United States Patent [19]
Vance

[11] 3,875,804
[45] Apr. 8, 1975

[54] TIRE BALANCING MACHINE

[76] Inventor: Edison G. Vance, 6200 Nebraska Ave., Tampa, Fla. 33604

[22] Filed: May 2, 1973

[21] Appl. No.: 356,586

[52] U.S. Cl. ................................. 73/457; 73/487
[51] Int. Cl. .......................................... G01m 1/28
[58] Field of Search ............ 73/457, 458, 487, 70.2, 73/71; 74/16

[56] References Cited
UNITED STATES PATENTS

| | | | |
|---|---|---|---|
| 2,722,829 | 11/1955 | Ringering | 73/457 |
| 2,728,236 | 12/1955 | Hemmeter | 74/16 |
| 2,777,327 | 1/1957 | MacMilla | 73/457 |
| 2,782,641 | 2/1957 | Allen | 73/457 |
| 3,078,720 | 2/1963 | Hofmann | 73/457 |
| 3,321,960 | 5/1967 | Bjorn | 73/487 X |
| 3,483,764 | 12/1969 | Hunter | 74/16 |
| 3,504,533 | 4/1970 | Rodewalt | 73/71 |

*Primary Examiner*—James J. Gill
*Attorney, Agent, or Firm*—Stein and Orman

[57] ABSTRACT

A device for high speed balancing of automotive tires by rotating the tire while the tire is normally installed on the vehicle. An electric motor operatively mounted on a portable platform, is mechanically coupled to a rotating assembly comprising a cylindrical drum having a substantially smooth exterior surface disposed for operatively engaging and rotating the tire. A platelike brake means is disposed on the forward portion of the platform and in operative communication with the rotating assembly and tire for stopping the rotation of the tire. A vertically oriented rod is mounted on the platform for operatively engaging a locking member to lock the device against lateral motion in predetermined position relative to the tire during a balancing operation. The device is constructed and dimensioned to be movable over a supporting surface and positionable at a desired height relative to a vehicle mounted tire positioned on an hydraulic lift.

5 Claims, 3 Drawing Figures

PATENTED APR 8 1975 3,875,804

TIRE BALANCING MACHINE

BACKGROUND OF THE INVENTION

1. Field of the Invention

This invention relates to a device for balancing automotive tires. More specifically, this invention relates to a machine for rotating an automotive tire at a high rate of speed while the tire is normally installed on the vehicle and while the vehicle is raised on an hydraulic lift.

2. Description of the Prior Art

It is common knowledge that unbalanced tires cause excessive tire wear, riding discomfort and generally impair the handling qualities of the vehicle itself. Such imbalances do result during the manufacture of the tires or during the operation of the vehicle where the tires are exposed to severe bumps or misalignment. An unbalanced tire is particularly harmful and dangerous when traveling at the high rates of speed typical of today's modern passenger cars.

Because such problems are commonplace, a number of tire balancing machines have been known in the art for some years. Unfortunately, many of these are stationary and not readily adaptable for use in filling stations, front end or alignment shops, garages or new car shops, and there is a need for such devices. Other prior art machines, because of the location of the rotating means at floor level, do not provide a comfortable working posture for the operator of the machine. Another disadvantage commonly found in such devices is the necessity of dismounting the wheel from the automotive vehicle in order to accomplish the tire balancing operation.

Thus, despite the number of machines available, the conventional tire balancing machine is generally costly in terms of capital expense and operating efficiencies and in many instances does not rotate the tire at a great enough speed to accurately balance it in a standing position.

SUMMARY OF THE INVENTION

The present invention relates to a high speed tire balancing machine. The machine comprises a platform mounted on the top of a cabinet which is in turn attached to a plurality of rollers, or like elements, suitably arranged on the cabinet so that the entire device may be easily moved over a supporting surface.

A tire rotating assembly is mounted on the platform and is mechanically coupled to an electric motor powered by an external power supply. The tire rotating assembly comprises a cylindrical drum having a substantially smooth cylindrical surface about its periphery and radially extending spokes formed within its interior. The tire rotating assembly is attached to a shaft extending from the motor through a hole formed at the intersection of the spokes of the tire rotating assembly.

The machine further includes a brake assembly attached to a portion of the platform substantially adjacent the rotating assembly. The brake assembly comprises a substantially U-shaped lever and a brake shoe. The brake shoe is mechanically coupled to the elongated base portion of the lever so that when the lever is depressed the brake shoe is raised due to the relative positions of the lever and the brake shoe to each other and their fixed connection to the lever base portion. When the lever is pulled forward the brake shoe abuts the cabinet, and the machine rolls forward so that the drum engages the tire. The cabinet includes a plurality of horizontally disposed shelves which may be used for the storage of various tire balancing instruments or similar tools.

A locking means is attached to the cabinet and at least one of the rollers. The locking means comprises an elongated locking rod attached to the cabinet in corresponding relation to a locking plate attached to at least one of the rollers. The machine is locked into a straight line operative position by inserting the locking rod through a hole provided in the locking plate.

A vibration indicator means is attached to a fender adjacent the tire to be balanced. The vibration indicator means comprises a rubber suction cup having mounted thereon a substantially L-shaped strip of metal.

In operation, the operator mounts an external balancing attachment to the rim of the tire to be balanced. The vibration indicator means is attached to the adjacent fender. The vehicle is then raised several feet above the supporting surface by means of an hydraulic lift, or like device, permitting the tire to be rotated freely. The forward portion of the machine is positioned parallel to the tread of the tire to be balanced with the rotating assembly in close proximity with the tread of the tire. The operator next locks the machine in place by engaging the locking means. The electric motor is switched on and the energy therefrom is mechanically translated into rotary motion of the tire rotating assembly. The operator pulls either arm of the U-shaped brake lever forward to engage the rotating assembly with the tread of the tire. This in turn results in high speed rotation of the tire.

While the tire is rotating, the operator observes the imbalance of the tire by means of the external balancing attachment and the vibration indicator means. The operator next stops the rotation of the tire by depressing either upwardly extending arm of the U-shaped brake lever so that the brake shoe contacts the tire and the machine rolls back to disengage the rotating assembly and the tire, thereby stopping rotation of the tire by frictional forces.

Finally, the operator attaches predetermined tire balancing weights to the rim of the tire in the positions indicated by the external balancing attachment. The operator repeats the above steps to insure that the tire is properly balanced. The operator then unlocks the machine and repeats the above steps to balance the remaining tires.

One advantage of this machine is that its design allows other servicing of the vehicle, such as rotating tires or trueing tires, to be accomplished concurrently with the tire balancing operation. Other advantages are its mobility, simplicity of construction and simplicity and comfort in operation.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and the objects of the invention, reference should be had to the following detailed description taken in connection with the accompanying drawings in which.

Similar reference characters refer to similar parts throughout the several views of the drawings.

DETAILED DESCRIPTION

Figure 1:
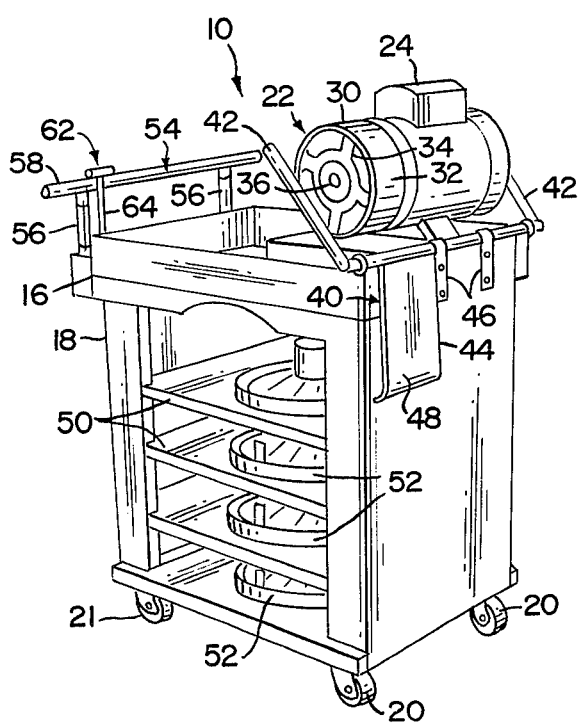
FIG. 1 shows a front elevational view of the forward portion of the present invention.
Figure 2:
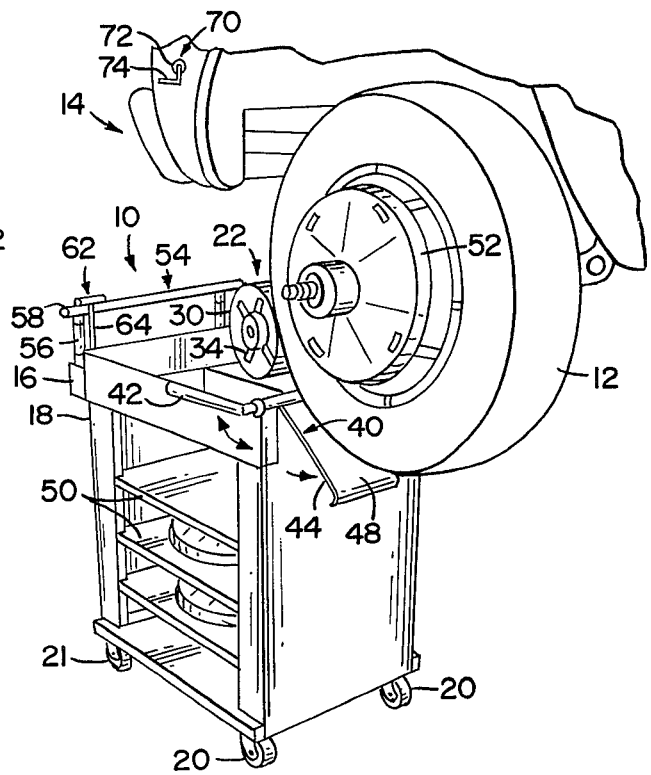
FIG. 2 shows a side elevational view of the present invention operatively engaged with an automotive tire.

Referring particularly to FIGS. 1 and 2, a tire balancing machine generally indicated as 10 is operatively engaged with an automobile tire 12 which is normally mounted on a vehicle generally indicated as 14 which is elevated by some external means (not shown) such as an hydraulic lift or the like.

Figure 3:
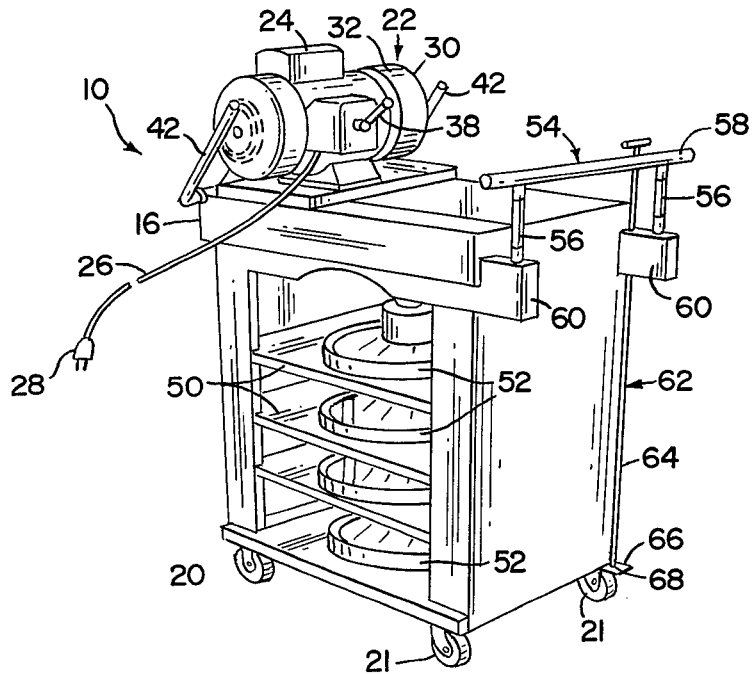
FIG. 3 shows a rear elevational view of the cabinet and remainder of the device mounted thereon.

As best seen in FIGS. 1 and 3, the machine 10 comprises substantially rectangular platform means 16 mounted on substantially an upper portion of cabinet means 18 which is supported on a plurality of roller means 20 and 21 or like elements, attached to the corners or applicable structures thereof. Front roller means 20 are fixedly attached to cabinet 18 as indicated in FIG. 1. Rear roller means 21 are attached to cabinet 18 for pivotal movement. A tire rotating means generally indicated as 22 is mechanically coupled to an electric driving means 24 comprising a motor powered by an external power supply through a conventional electric cord 26 and plug 28, all of which are mounted on platform 16.

Tire rotating means 22 comprises a cylindrical drum 30 having a substantially smooth cylindrical surface 32 about its periphery and radially extending spokes 34 formed within its interior. Tire rotating means 22 is attached to motor 24 by means of a nut 36, or like device, attached to a shaft (not shown) extending from motor 24 through a hole formed in the intersection of spokes 34. Motor 24 is actuated by means of switch 38 and is attached to a forward portion of platform 16 by means of bolts (not shown) or like devices. Motor 24 in the preferred embodiment is designed for both forward and reverse rotation.

The machine 10 further includes brake means generally indicated as 40 attached to a portion of platform 16 substantially adjacent to rotating means 22. Brake means 40 comprises a substantailly U-shaped lever 42 and a brake shoe 44. Lever 42 is attached to platform 16 through straps 46 so as to be freely rotatable as best indicated in FIG. 2. Because of the substantially U-shaped configuration of lever 42, brake means 40 can be operated from either side of machine 10. Brake shoe 44 comprises a substantially flat sheet of metal or like substance having a substantially smooth operative surface 48. Brake shoe 44 is mechanically coupled to the elongated base portion of lever 42. When lever 42 is depressed brake shoe 44 is raised due to the relative positions of lever 42 and brake shoe 44 to each other and their fixed connection along the elongated base portion of lever 42. Similarly, when lever 42 is pulled forward, brake shoe 44 abuts cabinet 18, and the machine rolls forward so that drum 30 engages tire 12.

Cabinet 18 includes a plurality of horizontally disposed shelves 50 which may be used for the storage of various tire balancing indicators or similar tools generally indicated as 52. Cabinet 18 further includes handle means generally indicated as 54 whereby an operator may easily move machine 10 about the supporting surface. Handle means 54 comprises support members 56 and cross member 58 and is attached to cabinet 18 at arms 60 extending outward from and perpendicular to a side of cabinet 18.

As best shown in FIG. 3, the machine 10 further includes locking means generally indicated as 62 attached to cabinet 18 and at least one of rollers 21 whereby machine 10 may be locked against lateral movement. Locking means 62 comprises an elongated locking rod 64 attached to a portion of cabinet 18 for reciprocal movement and a locking plate 66 attached to the frame of roller 21 in corresponding relation to locking rod 64. Locking plate 66 comprises a sheet of metal of such a size and shape as to extend beyond the periphery of cabinet 18 when roller 21 is suitably positioned and includes a hole 68 which is correspondingly configured as locking rod 64.

A vibration indicator means generally indicated as 70 in FIG. 2 is attached to a fender adjacent tire 12. Indicator 70 comprises a section cup 72 having attached thereto, by means of a screw or similar device (not shown), a substantially L-shaped strip of metal 74.

To operate, an external balancing attachment 52 is attached to the rim of the tire 12, and vibration indicator means 70 is attached to a fender adjacent thereto. The automotive vehicle 14 is raised on an hydraulic lift or some similar device (not shown). As best shown in FIG. 2, the forward portion of machine 10 is positioned parallel to the tread of tire 12 with rotating means 22 substantially adjacent to tire 12. The machine 10 is locked against lateral movement and into operative position by inserting locking rod 64 through the hole 68 formed in locking plate 66.

The operator then activates motor 24 by turning switch 38 to the on position. The energy of motor 24 is mechanically translated through a shaft (not shown) into rotary motion of drum 30. The operator pulls either upwardly extending arm of lever 42 forward whereby machine 10 rolls forward so that the surface 32 of drum 30 engages the tread of tire 12. This in turn results in high speed rotation of tire 12.

The operator then observes the imbalance of tire 12 by means of external balancing attachment 52 and vibration indicator means 70. The operator next stops the rotation of tire 12 by depressing either upwardly extending arm of brake lever 42 so that brake shoe 44 contacts the tread of tire 12 and machine 10 rolls back to disengage rotating assembly 22 and tire 12, thereby stopping rotation of tire 12 by frictional forces.

Having stopped rotation of tire 12, the operator attaches predetermined tire balancing weights (not shown) to the rim of tire 12 in the positions indicated by external balancing attachment 52. The operator repeats the above steps to insure that tire 12 is properly balanced. The operator then unlocks machine 10 and repeats the above steps to balance the remaining tires.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A tire balancing machine of the type to be used to balance tires mounted on an automobile vehicle, said machine comprising: cabinet means comprising a plurality of horizontally disposed shelves; platform means mounted on an upper portion of said cabinet means, said cabinet means being configured and dimensioned to dispose said upper portion and said platform means substantially adjacent the mid-portion of the body of an up-standing operator of said machine; whereby the operator may operate said machine when oriented in a fully up-standing position; tire rotating means comprising a cylindrical drum having a substantially smooth cylindrical surface about its outer periphery and radially extending spokes formed within its interior attached to said platform means and disposed to engage the tread face of the tire; driving means mounted on said platform means and connected in driving relation with said tire rotating means, whereby said rotating means is rotated when said driving means is actuated; brake means attached to a portion of said platform substantially adjacent said rotating means and comprising a substantially U-shaped lever and a brake shoe attached to the elongated base portion of said U-shaped lever, said brake shoe comprising a substantially flat configuration having a substantially smooth operative surface; a plurality of roller means attached about the outer portions of the under portion of said cabinet means in supporting relation thereto; and locking means comprising an elongated locking rod attached to a portion of said cabinet means for reciprocal movement and a locking plate attached to at least one of said roller means in corresponding relation to said locking rod.

2. A machine as in claim 1 wherein said locking plate is fixedly attached to the frame of said one roller means, whereby said one roller means is locked against pivotal movement when said locking rod is engaged with said locking plate.

3. A machine as in claim 1 which further includes handle means attached to said cabinet whereby an operator may move said machine over the supporting surface.

4. A machine as in claim 1 wherein said locking plate comprises a sheet of metal or similar substance of such a size and shape as to extend beyond the periphery of said cabinet when said roller is suitably positioned, said locking plate including a hole correspondingly configured as said locking rod.

5. A machine as in claim 1 further comprising vibration indicator means including a substantially L-shaped strip of flexible material attached to a suction cup.

* * * * *